United States Patent [19]

Labrie et al.

[11] Patent Number: 5,558,731
[45] Date of Patent: Sep. 24, 1996

[54] METHOD FOR FABRICATING VINYL COVERED FOAMED PARTS

[75] Inventors: Craig B. Labrie, Dover, N.H.; Claude E. Bemis, York, Me.; Robert J. Dadura, Hooksett, N.H.

[73] Assignee: Davidson Textron Inc., Dover, N.H.

[21] Appl. No.: 358,358

[22] Filed: Dec. 19, 1994

[51] Int. Cl.⁶ ............................................. B32B 31/12
[52] U.S. Cl. .................... 156/78; 156/182; 156/228; 156/213; 156/214; 156/256; 264/46.4
[58] Field of Search .................... 156/228, 78, 182, 156/214, 216, 308.4, 213, 79, 245, 256; 264/46.4

[56] References Cited

U.S. PATENT DOCUMENTS

| | | | |
|---|---|---|---|
| 4,046,611 | 9/1977 | Sanson | 264/46.4 |
| 4,217,325 | 8/1980 | Colby | 264/245 |
| 4,328,067 | 5/1982 | Cesano | 156/511 |
| 4,535,574 | 8/1985 | Dettelbach et al. | 264/46.4 |
| 4,542,887 | 9/1985 | Bethell et al. | 264/46.4 |
| 4,664,864 | 5/1987 | Wersosky | 264/301 |
| 4,769,278 | 9/1988 | Kamimura et al. | 156/228 |
| 4,793,784 | 12/1988 | Belleville et al. | 425/111 |
| 4,793,793 | 12/1988 | Swenson et al. | 425/503 |
| 4,806,094 | 2/1989 | Rhodes, Jr. et al. | 425/543 |
| 4,839,118 | 6/1989 | Labrie | 264/46.5 |
| 4,882,002 | 11/1989 | Ando et al. | 156/182 |
| 4,892,770 | 1/1990 | Labrie | 428/71 |
| 4,902,362 | 2/1990 | Stewart et al. | 156/245 |
| 4,925,151 | 5/1990 | Gray | 249/65 |
| 5,106,547 | 4/1992 | Beck et al. | 264/46.4 |
| 5,196,151 | 3/1993 | Sakaida et al. | 264/46.4 |
| 5,290,499 | 3/1994 | Tischler | 264/301 |

*Primary Examiner*—Michele K. Yoder
*Attorney, Agent, or Firm*—Reising, Ethington, Barnard & Perry

[57] ABSTRACT

A method for fabricating plastic interior trim components having an insert with openings therein joined to a composite member including a shell and a foam layer, the method including die punching a hole through the shell and foam layer and die punching an edge extension on the shell to a predetermined parametric form; providing a press that is operable to compress a part therebetween and including a first platen and a second platen moveable between opened and closed positions with respect to one another; providing an insert having an opening; supporting the insert on one of said first and second platens and applying adhesive on a surface of the insert; loading the composite member on the other of said first and second platens so that the foam layer thereof is facing the adhesive sprayed insert inboard of the die cut edge extension; closing the press to compress the adhesive sprayed surface against the foam layer of the composite member for adhering the insert only to the foam layer without leakage of foam through openings in the insert.

5 Claims, 2 Drawing Sheets

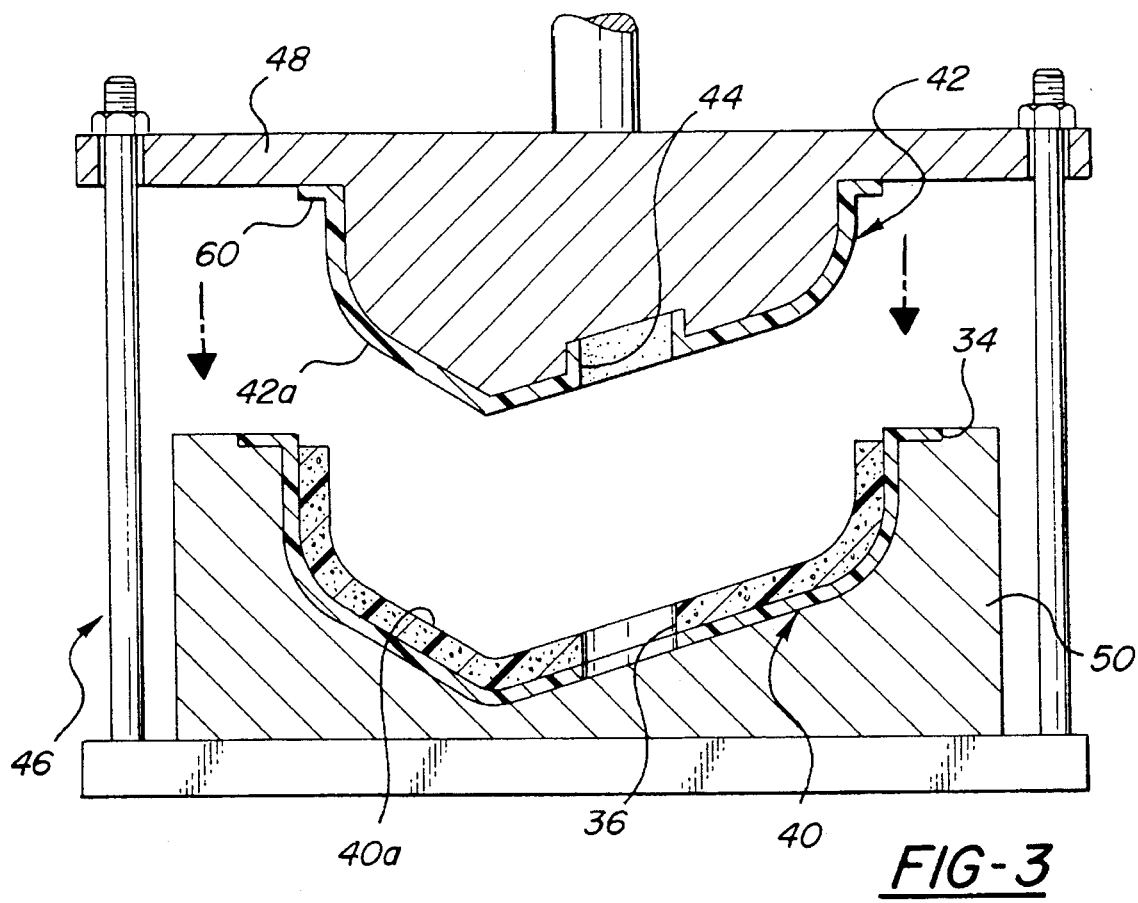
FIG-3
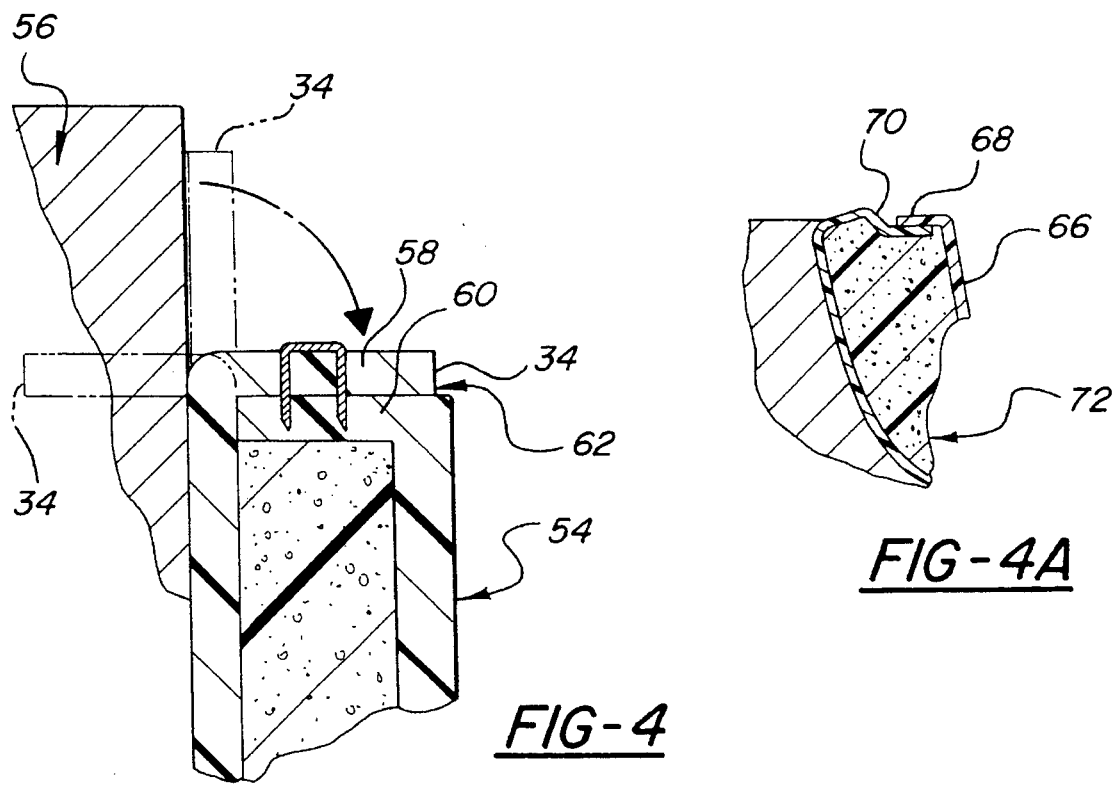
FIG-4
FIG-4A 5,558,731

METHOD FOR FABRICATING VINYL COVERED FOAMED PARTS

TECHNICAL FIELD

This invention relates to composite plastics for use as automobile trim products and more particularly to methods for making such composite plastics having an outer shell layer; a foam layer molded to the outer shell and an insert member bonded to the foam layer.

BACKGROUND OF THE INVENTION

U.S. Pat. Nos. 4,793,784; 4,793,793; 4,806,094; 4,839,118; and 4,892,770 disclose molding a layer of resilient foam with respect to an outer shell or shell and an insert of rigid material. While suitable for their intended purpose, such molding requires that holes or other apertures in the insert be sealed to prevent the escape of foam through the insert member. Furthermore, such methods require that holes be cut through the outer skin and foam layer after connection to the insert to form openings congruent with preformed openings in the insert. Such preformed openings, for example are provided for connection to various duct work and the like when an interior trim product is used in association with other components such as air conditioning systems, audio sound systems and the like. Such aperture sealing systems are disclosed in U.S. Pat. Nos. 4,968,465 and 5,234,639. Such aperture sealing systems require considerable handwork to mask the holes in the insert and to trim foam leakage from the insert if there is leakage.

SUMMARY OF THE INVENTION

The present invention eliminates the need for sealing a perforated insert in a foam in place method for the manufacture of composite plastic parts for use as automotive interior trim products. The composite plastic part has a flexible outer skin or shell with a molded foam layer thereon connected to an insert having openings therein for connection to systems associated with the interior trim product.

An object of the present invention is to reduce the amount of handwork to seal insert openings; eliminate preparation operations of taping openings (in the insert) and waxing the insert and pour mold for joining an insert to a shell and foam type composite member; and to eliminate post operations including picking foam leakage from the interface between the insert, seal components, and shell; and to eliminate washing the piece for removing the foam pickings from the finished part.

A further object of the invention is to reduce such handwork by a method that includes adhering an insert with openings therein to a composite preform having skin or shell and foam with openings die cut therein to conform to the insert openings.

A still further object of the present invention is to provide for such adhering by providing a composite preform including a shell and a foamed in place layer of flexible foam and die cut the composite preform of shell and foam to have holes alignable with those in an insert; providing a press having first and second platens for respectively mounting the composite preform and an insert; applying adhesive to an exposed surface of the insert and pressing the adhesive bearing exposed surface to the composite preform at the foam layer thereon to respectively align openings in the composite preform and the insert while bonding the insert to the composite preform.

Yet another object of the invention is to reduce the cost of processing a laminated shell and molded in place foam with an insert part by a process including the steps of: forming a composite preform having a flexible skin having an edge extension and including a foam layer located inboard of the edge extension; die punching the edge extension on the shell to form a shell edge; providing a press that is operable to press a part therebetween and including a first platen and a second platen moveable between opened and closed positions with respect to one another; supporting an insert on one of said first and second platens and applying adhesive on a surface of the insert; loading the composite preform on the other of said first and second platens so that the foam layer thereof is facing the adhesive sprayed insert inboard of the shell edge; closing the press to press the adhesive sprayed surface against the foam layer of the composite member for bonding the insert to the composite preform without leakage of foam through openings in the insert.

Still another object is to further reduce costs by the method of the preceding object including additional steps of providing a nesting fixture; removing the bonded composite preform and insert from the press and placing the bonded composite preform and insert in the nesting fixture; bending the shell edges against the insert to form an overlapping joint therebetween and mechanically joining the shell edges to the insert at the overlapping joint. An alternative method of edge treatment includes providing an insert with a bent edge that covers a bent end on the shell.

BRIEF DESCRIPTION OF THE DRAWINGS

Other objects, features and advantages of the present invention will be readily appreciated as the same become better understood by reference to the following detailed description when considered in connection with the accompanying drawings wherein:

FIG. 3 is a diagrammatic view of a press for bonding the die punched composite preform to an insert; and FIGS. 4 and 4A are fragmentary diagrammatic views of nesting fixtures for providing a return bend portion and for positioning the return bend portion for mechanical connection to the insert.

DETAILED DESCRIPTION OF A PREFERRED EMBODIMENT OF THE INVENTION

Figure 1:
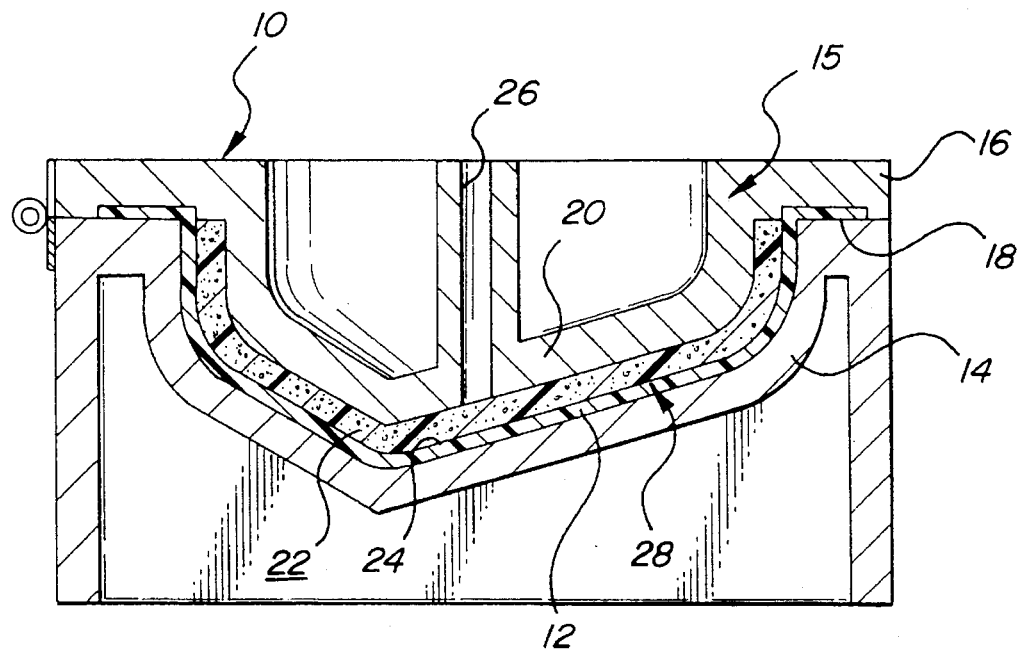
FIG. 1 is a diagrammatic view of a mold apparatus for providing a composite preform having a shell and a foam layer used in practicing the method of the present invention.

Referring now to FIG. 1, a mold 10 is illustrated for supporting a flexible shell or skin 12 formed by processes such as set forth in U.S. Pat. Nos. 4,217,325; 4,664,864; 4,925,151 and 5,256,354, owned by the assignee of the present application and incorporated herein by reference. The skin 12 is supported on a female cavity part 14 that is closed by a cover 15 having first cover portion 16 that shapes the skin 12 to have a perimeter edge 18 and a second cover portion 20 that forms a cavity 22 between the interior surface 24 of the skin 12 while shielding the perimeter edge (shut-off) 18. The mold 10 includes a fill opening 26 for directing foam precursors into the cavity 22 as representatively shown in U.S. Pat. No. 4,992,224 owned by the assignee of the present invention and incorporated herein by reference.

The foam precursors react in a known manner to provide a foam layer 28 that is bonded to the interior surface 24 of the skin but leaving the inner surface of the perimeter edge 18 clean of such material.

Figure 2:
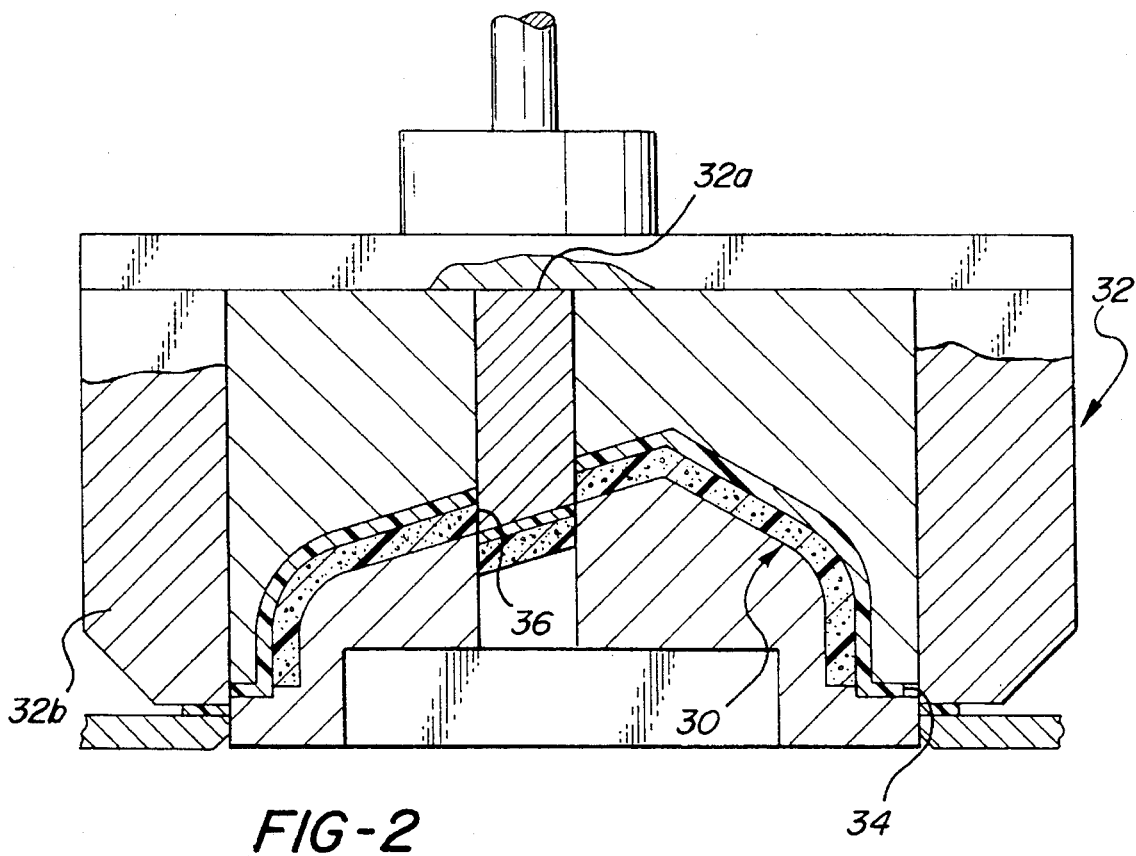
FIG. 2 is a diagrammatic view of a die cut/trim apparatus for providing a die punched composite preform used in practicing the method of the present invention.

A composite preform 30 is removed from the mold apparatus 10 following the foaming operation. The composite preform 30 is then loaded on a die press 32 representatively shown in FIG. 2 as a compound die with a blanking punch insert 32a and an edge forming punch 32b. The composite preform 30 is pierced by punch 32b to cut the perimeter edge 18 to form shell edge 34 having a desired shape. The insert 32a forms an opening 36 through the foam layer 28 and shell 12. While the edge 34 and hole 36 can be formed in one operation, it will be appreciated that the edge and hole formation can be accomplished by passing the preform 30 through a press system, including a hole punch and edge punch.

The punched part is then removed from the die press 32 as a die punched composite preform 40.

An insert 42 is provided that includes an opening 44 therein that is alignable with the opening 36 in the punched composite skin and foam preform 40.

In accordance with the present invention, a holding press 46 is provided that includes first and second platens 48, 50 adaptable to be secured respectively to the insert 42 and the die punched composite preform 40. When the insert 42 and preform 40 are secured on the platens 48, 50 closure of the press 46 will align the opening 36 with the opening 44 in the insert 42. While only one set of openings is shown, it will be appreciated by those skilled in the art that more than one set of openings can be provided in the insert 42 and the preform 40 for alignment therebetween when the press 46 is closed.

In accordance with another aspect of the invention, adhesive is directed through spray heads on the insert 42 at an exposed surface 42a thereof or to the press mounted preform 40 at an exposed surface 40a thereof. The press 46 is closed to apply holding pressure between the exposed surfaces 40a, 42a to cause the adhesive thereon to react and bond the parts together.

A bonded composite 54, partially shown in FIG. 4, is formed that includes an insert, skin and foam layer that are joined without having to provide against foam leakage with the attendant problems heretofore experienced in the manufacture of interior trim parts for vehicles such as instrument panels, glove doors, door panels, arm rests and the like.

Following the step of providing the bonded composite 54, it is removed from the press 46 and placed in a nesting fixture 56 that has a surface 56 thereon that will position the edge flange 34 so that it can be turned to form a return bend 58 that engages the outer peripheral edge flange 60 of the insert 42 to form an overlap joint 62 therebetween. The overlap joint 62 is connected to the insert 42 by suitable fasteners 64 such as adhesive, staples, screws or other suitable interconnections.

Alternatively, as shown in FIG. 4a, an insert 66 is provided with a bent edge flange 68 that overlaps a bent edge flange 70 on a foamed shell 72.

The method of the present invention is shown in block diagram form as follows:

Forming a composite preform (30) having a shell (12) and a foam layer (28).
Die punching an edge (34) on the shell to a predetermined parametric form; die punching opening 36 through the shell and foam layer.
Providing a holding press (46) operable to press a part therebetween and including a first platen and a second platen moveable between opened and closed positions with respect to one another.
Supporting an insert member (42) on one of said first and second platens; and applying adhesive on a surface of the insert member;
Loading the composite preform on the other of said first and second platens so that the foam layer thereof is facing the insert inboard of the die punched edge extension.
Spraying adhesive on either the insert member or the foam layer, or both.
Pressing the adhesive sprayed surface for adhering the insert to the foam layer without leakage of foam through openings in the insert.
Providing a nesting fixture.
Placing the bonded composite preform and insert in the nesting fixture; and bending the shell edges against the insert to form an overlapping joint (62) therebetween and mechanically joining said shell edges to the insert at the overlapping joint.

Variations and modifications are possible without departing from the scope and spirit of the present invention as defined by the appended claims.

What is claimed is:

1. A method for fabricating an interior trim product having an insert with an opening therein, an outer shell of thermoplastic material and an interposed layer of urethane foam comprising the steps of:

forming a shell of thermoplastic material by casting thermoplastic material against a heated mold; removing the shell from the heated mold;

providing a closed foaming mold having a female cavity part and a cover;

opening the closed foaming mold and locating the shell in the female cavity part; closing the mold cover with respect to the female cavity part to form a closed foaming mold cavity formed by the cover and the shell and directing foam precursors into the closed foaming mold cavity; reacting the foam precursors to fill the closed foaming mold cavity to form a composite preform having a layer of urethane foam and a shell layer of thermoplastic material;

providing a cutting die and placing the preformed composite having a layer of urethane foam and shell layer of thermoplastic material thereon and cutting the preformed composite to form an opening therethrough;

providing a press having first and second platens operable to press a part therebetween; supporting the cut preformed composite on one of the first and second platens and supporting the insert with an opening therein on the other of the first and second platens so as to locat the opening in the preformed composite in alignment with the opening in the insert with the foam layer on the preformed composite facing the insert;

applying adhesive on the insert or the urethane foam layer of the preformed composite either before or after the insert and preformed composite are placed on the first and second platens; closing the press to hold the adhesive on the insert and/or preformed composite between the insert and preformed composite for adhering the insert to the urethane foam layer of the preformed composite; and forming an overlapping joint between the insert and the shell by engaging the insert with the shell at the edge of the foam layer.

2. The method of claim 1 further characterized by:

providing a nesting fixture;

placing the adhered preformed composite member and insert in the nesting fixture; and bending the shell against the insert to form an overlapping joint therebetween and mechanically joining the bent shell to the insert at the overlapping joint.

3. The method of claim 1 further characterized by:

spraying adhesive only on the insert member;

closing the press to compress the adhesive sprayed surface on said insert against only the foam layer of said composite member for adhering the insert only to the foam layer;

pressing the insert against the composite member to cause the adhesive to bond the insert to the composite member; and removing the bonded composite member and insert from the press.

4. The method of claim 1 including removing the adhered insert and preformed composite from the press and forming the overlapping joint after the adhered insert and preformed composite joint have been removed from the press.

5. The method of claim 1 including preforming the insert to have a flange thereon; preforming the preformed composite to have a shell with a flange covering the edge of the urethane foam layer prior to placing the preformed composite in the press; and the applying adhesive step including applying adhesive either on the flange of the insert or the flange of the shell and thereafter joining the flanges to one another when the press is closed to form an overlapping joint therebetween; and removing the adhered insert and preformed composite from the press.

* * * * *